(12) United States Patent
Blick et al.

(10) Patent No.: US 8,181,948 B2
(45) Date of Patent: May 22, 2012

(54) TILT MACHINING DEVICE AND METHOD

(76) Inventors: John Blick, Laguna Beach, CA (US); Daniel Wacholder, Laguna Beach, CA (US)

(*) Notice: Subject to any disclaimer, the term of this patent is extended or adjusted under 35 U.S.C. 154(b) by 673 days.

(21) Appl. No.: 12/157,799

(22) Filed: Jun. 12, 2008

(65) Prior Publication Data

US 2009/0309283 A1 Dec. 17, 2009

(51) Int. Cl.
*B25B 11/00* (2006.01)

(52) U.S. Cl. ............................ 269/21; 269/20

(58) Field of Classification Search .............. 269/21, 269/20, 900; 294/86.4
See application file for complete search history.

(56) References Cited

U.S. PATENT DOCUMENTS

| 5,143,360 | A  | * | 9/1992  | Wilken et al. | 269/21  |
|-----------|----|---|---------|---------------|---------|
| 6,068,547 | A  | * | 5/2000  | Lupi          | 451/388 |
| 6,186,567 | B1 | * | 2/2001  | Blick         | 294/86.4|
| 6,247,891 | B1 | * | 6/2001  | Lind          | 414/811 |
| 6,286,822 | B1 | * | 9/2001  | Blick         | 269/21  |
| 6,817,933 | B2 | * | 11/2004 | Blick         | 451/388 |

* cited by examiner

*Primary Examiner* — Lee D Wilson
(74) *Attorney, Agent, or Firm* — Curtis L. Harrington; Harrington & Harrington

(57) ABSTRACT

The support system and method enables exact and preferably machine assisted manual location and height placement of a vacuum operated hold down with rigid pre-set support on a conventional working table. A height adjustable jack screw support with angularly flexible hold down enables a holding support engaging the bottom of a work piece even where a lower surface of the work piece has an irregular shape due to the ability of the upper cup support to passively tilt to engage the work piece.

13 Claims, 14 Drawing Sheets

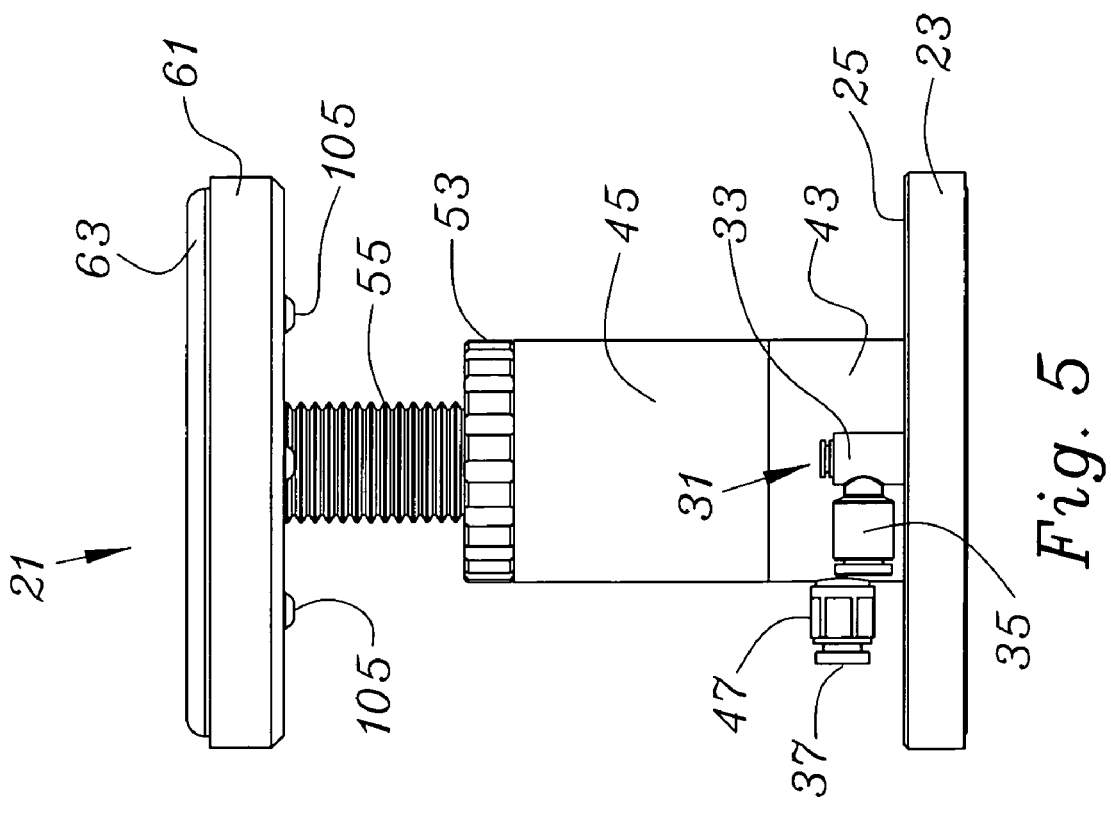
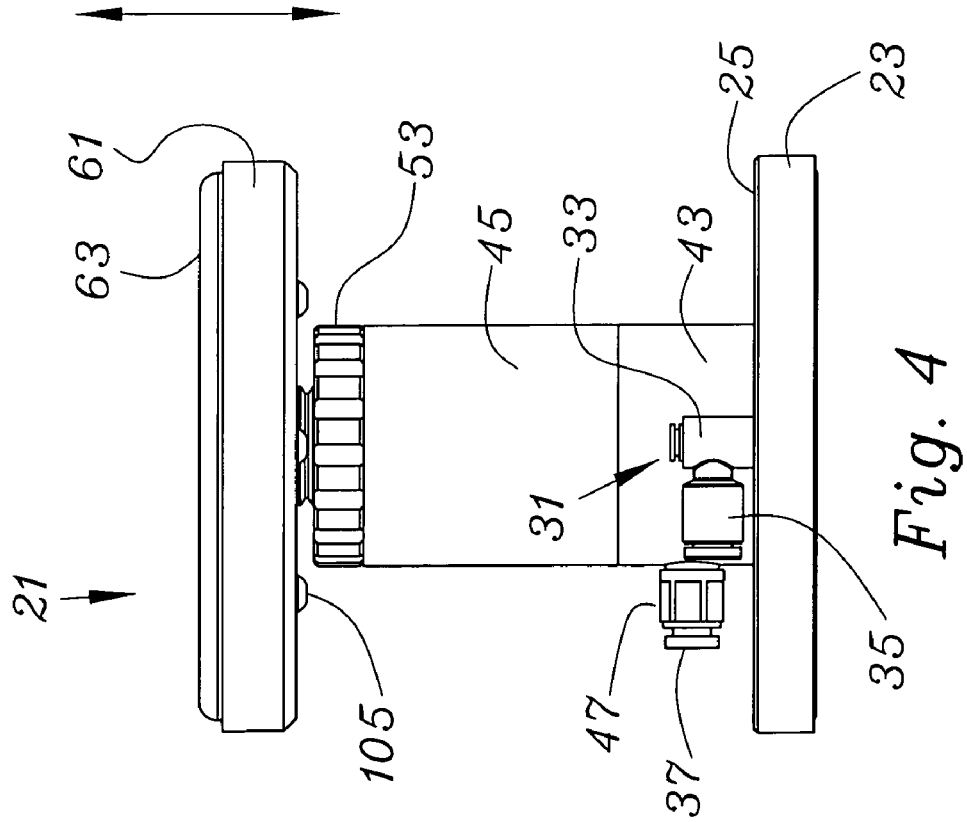

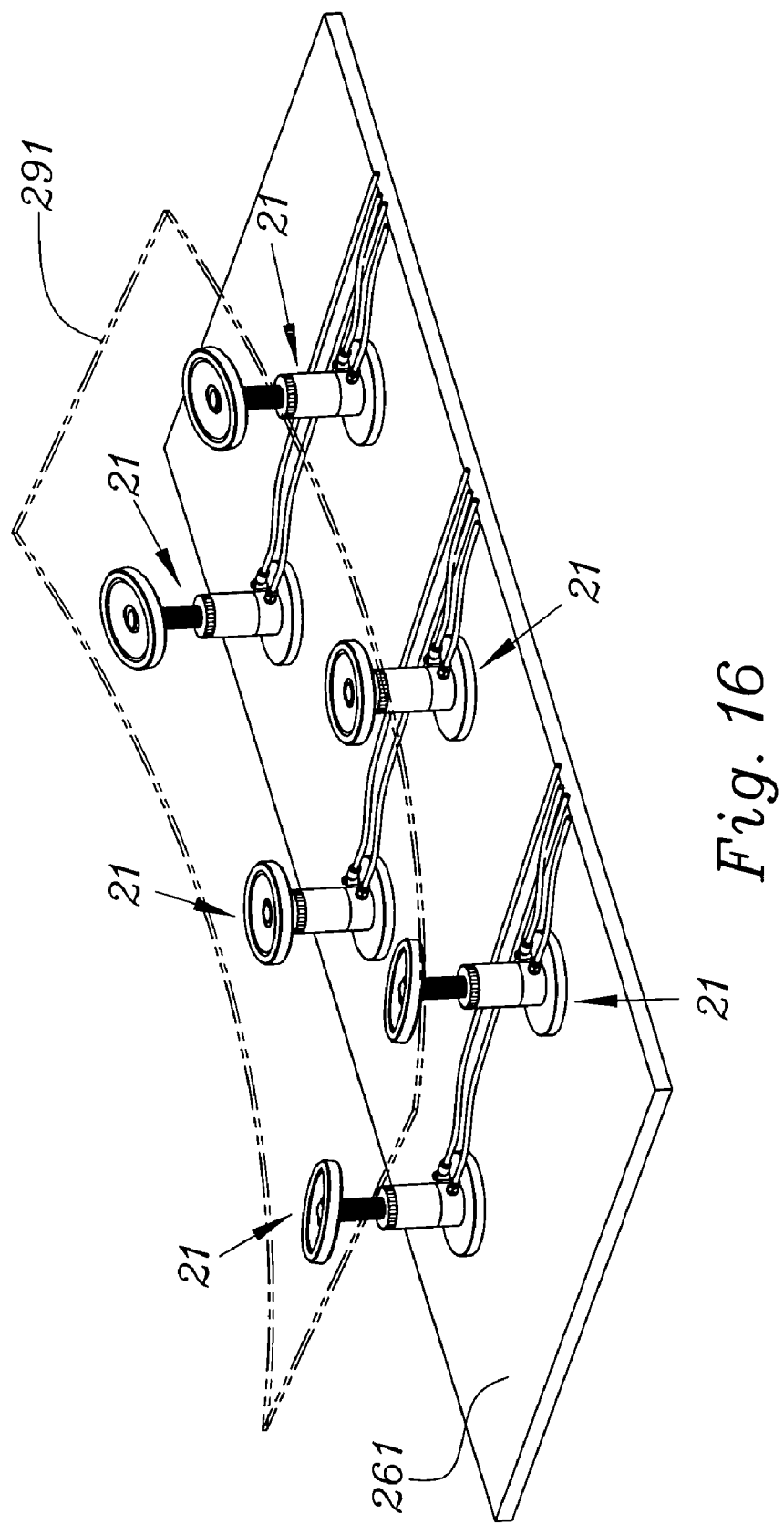

TILT MACHINING DEVICE AND METHOD

FIELD OF THE INVENTION

The present invention relates to improvements in the field of work holding devices for machining work. More specifically, the present invention relates to a device and method used to locate and secure both simple planar and complex compound shaped parts held in place by vacuum for the purpose of machine processing by computer numerical controlled milling machines typically used in the processing of sheet type materials by multi axis machines. The hold down system is used to accurately locate and secure sheet materials of various thickness, shape and composition to the working table surface of machines for processing.

BACKGROUND OF THE INVENTION

As was described in U.S. Pat. No. 5,562,276, issued on Oct. 8, 1996 to the inventor of the instant application and entitled "LOCATOR AND HOLD DOWN SYSTEM FOR A MACHINE" and which is incorporated by reference herein, a vacuum hold down system for a working table facilitated the location and positioning of structures with respect to a work piece which is to be milled, sanded, ground, etc. with a router-type spindle which travels around a work piece, was illustrated. That invention aided the precision of location and stability of any device on the working table.

Further, as was described in U.S. Pat. No. 6,186,567, issued on Feb. 13, 2001 to the inventor of the instant application and entitled "AUTOMATIC CLAMPING AND PLACEMENT HOLDER" and which is incorporated by reference herein, the use of an angled locator block associated with the motor unit which is normally used to drive a router and translated over the table was illustrated to assist manual placement of a locator device which was used to assist the attendant in locating the work piece, as well as a specialized structure for automatic carriage and positioning of such locator devices on the work table. The locator device simply caused the lifting of a lateral stop structure against which the work piece was located before the work piece was locked down. Prior to processing, the lateral stop structure would be retracted using a pressure control line. The lateral stop structure performed no vertical movement of a work piece.

Computer numerical controlled milling machines are used to process sheet and slab type materials of various material composition, shape, and dimensions. Prior to the actual processing of the materials it is necessary to properly and accurately locate the material to be processed within the limits of the working envelope of the machine with respect to the table surface of the machine and the location of the spindle of the machine relative to the intended movements of the spindle of the machine during its operation process. The hold down force necessary to support a work piece against the force from a rotating spindle is significant. Proper hold down force is necessary to maintain the proper location of the part during the machining process so as to insure accurate dimensional stability of the part, prevent vibration during processing, and insure the desired resultant dimensions of the part after processing are accurate. Typically, work holding supports using vacuum attached to both the underside surface of a sheet type material and to the machine table surface are used to forcibly secure the material for processing. Mechanical clamps may be used, however, mechanical clamps which attach to the edge of sheet materials prevent the processing of the edge immediately adjacent to the clamped portion, whereas vacuum driven supports attached to the underside of the material to be processed offer no obstruction to the machining process and allow for complete uninterrupted peripheral and surface processing. A typical flat working table of a machine must provide an absolutely stable platform to support the material to be worked be it a small table or a very large one. The location of the work piece laterally is important, and the vertical location of the work piece is also important.

Three Axis Machine Problem

As to the problems in working a material on a table with a three axis machine, it is important to recognize that the three axis motor driven spindle used on the work table can be precisely controlled in terms of its lateral position on the table (x and y positions) and height over the table (z position) by the computer numerical controller of the milling machine. Because the cutting head on the spindle on a three axis machine cannot tilt, an attempt to cut or grind a smooth angled surface not parallel to the machine work table surface or perpendicular to the spindle axis is not practically possible without the ability to tilt the work piece.

A practical solution to this problem has been to find some way of stably tilting the work piece, while providing a significant holding force to resist the ability of the spindle to move it. A solution used by conventional three axis machines involves the use of a thick, heavy metal plate which typically has to be moved onto the table with a fork lift or overhead lift. The heavy plate is then tiltably supported on the surface of the working table using jacks or pre-formed inserts either of which has to have the capacity to support the substantial weight of the plate, the conventional perpendicular hold down supports to be supported by the plate, as well as the work piece. In some instances a specialized heavy plate is used with a pivot at or near the center, or at one end, such as an axle or hinge, and having specialized jacking screws at one end to produce the angle of tilt.

The "heavy plate system" is typically fabricated at considerable cost. Further, each time a run of work pieces requiring a tilt is to be set up on a three axis machine, the setup time and effort is excessive. The work table has to be cleared, the heavy tilt plate has to be lifted and placed onto the table, then accurately located with respect to the spindle and stabilized with respect to the table at the proper angle. The setup has to be such that the tilted surface provided is absolutely stable. Only then can the remainder of the setup be effected using conventional hold downs located on top of the surface of the plate. The requirement of using a tilt plate and the extra effort for setup is extremely burdensome in terms of cost for the heavy plate, and the time required for setup.

Five Axis Machine Problem

A five axis machine is typically used to work the edge or field of a work piece having a complex shape. The five axis machine is typically used to process complex shaped materials with compound surfaces. Edge work on complex shapes may consist of processing the material perpendicular to the surface at the edge of or in the field of the material but may also involve processing the edge or the internal area of the material at a constant or changing angle to the surface of the material. Conventional hold downs will not work as conventional hold downs require a significant number of completely flat expanses on the bottom side of a work piece parallel to the work table so that a sufficient area of hold down vacuum can be applied, and this is almost never possible with a complex shape. A practical solution has been the construction of a custom made fixture which includes a series of distributed supports of the exact height and lateral distribution to enable a conforming fit and conforming support for the complex shaped object, sometimes referred to as a "bed of nails" type fixture, i.e., "nails" for supports of differing heights that conform to the underside of the irregular shape to be held in position for processing. This type of fixture will typically have its own specific method of hold down which will in turn be highly adapted to the specific shape and openings available on the complex shape. The costs of individual and specific custom made fixtures for each unique shape to be processed is prohibitive. The present invention allows for flexible adaptation of the work holding device to various and different complex shapes.

What is needed is a system which permits a conventional three axis machine to be used to work an angled surface into a material, but without having to use a heavy plate for setup. What is also needed is a system which permits a conventional five axis machine to be used with a complex shaped object to be worked without the need for design and construction of unique custom fixturing. The needed system should be cost effective and not require special, custom made fixtures tailored to a specific application but rather a system that allows flexible adaptation to many varied and different shapes using the same positionable, adjustable hold down devices.

SUMMARY OF THE INVENTION

The support system and method of the present invention incredibly facilitates working flat objects at an angle on a three axis table, and also enables support of a complex shaped object to be worked, typically an object with a curved surface which will be processed on a five axis machine.

A vacuum support with a height adjustable bearing support can be laterally located on a working table using a spindle mounted locator with assistance by the metric capabilities of the spindle to achieve an x and y and z position automatically as a guide for setup personnel. This enables exact lateral and depth, two dimensional position location on a working table, along with height adjustment of a support, with or without vacuum operated hold down, on a conventional working table. This allows for location of the work piece in three axes with reference to the work table and machine spindle. The three axis positioning of the work support allows accurate location of the work piece with respect to the desired processing to be performed by either a three axis or a five axis machine or other multi axis machine.

In general, to assist in an understanding of the use of the hold down support, two general applications can be cited as examples. In a first example relating to three axis machines, the hold down supports can be used to produce a tilt in a generally planar expanse of material. The tilt applied to the material permits the working spindle to form a corresponding angled structure on the generally planar expanse of material commonly from about one to one and a half degrees. In this first example, where an expanse of generally planar, constant thickness material is employed, the user specification of an angle will produce a corresponding support height for any location underneath the generally planar expanse of material to be supported. The specification of the surface to be supported is thus not complex, and the user can simply indicate the lateral (x and y) position on the table for each hold down support along with a given vertical (z) position, the combination of which in conjunction with subsequent x, y and z positions will provide for a given desired angle to a planar surface. A typical use for this type of processing is found in the fabrication of angular drainable surface of a kitchen counter top which allows water to drain into a sink from a solid surface counter top.

In a second example more related to five axis machines, the hold down supports can be used to support a complex shaped material to be worked by the spindle. In this second example, the machine operator can locate a complex shaped part by locating the x, y, and z coordinates of a group of adjustable work holding supports tangent to specific location points on the surface of the part so as to "cradle" and support the complex shape to be worked by the spindle.

In the steps for setting up the hold down supports on a table, the spindle supports a curved locator block and is used while the spindle is not rotating using the coordinate location capability of the numerical controller of the machine to locate the spindle and thus the curved locator block mounted in the spindle to a specific desired location point with reference to the work piece, the work table surface and the position of the spindle. The controller moves the spindle holding a locator block to an exact pre-programmed location, including x and y table location, and automatically positions the spindle to a corresponding z height. The hold down support has its height manually lowered to an extent sufficient so that it will fit slightly below the automatically positioned locator block. The hold down support is positioned against lateral surfaces of an angled or curved or other shaped locator block which is complementary to the hold down support thus achieving the x-y position of the hold down support. Once it is located on the x-y position with the locator block, the jackscrew structure on the hold down support is rotated or continued to be rotated until the center bearing member of the support bears against the underside of the locator block thus locating the z height of the work holding support. Then the jackscrew structure is locked into place using a locking device on the hold down support to prevent further movement or movement during the machining process.

Once this step is completed, the controller moves the spindle holding the locator block to another exact location, including x and y table location, and z height. The process is repeated until all of the hold down supports are exactly placed on the working table. Although the process involves manual activity in physically handling, emplacement, and vertical height adjustment to the upper extent of the locator block, the specification of the number and location of the hold down supports are done by program specification ahead of time so that at the time that the hold down supports are physically placed, the locator block locations are pre-specified so that the machine operator can perform the setup without any physical measurement or computation directly on the table having to be done by hand.

Thus, the machine programmer can select the appropriate support profile for any given job and specify the number and location of the hold downs to automate the process of physically setting up the table. The program dictates the manual placement and setting of the hold down supports for a given job given the shape and size characteristics of the work piece.

The hold down supports include suction hold down which has an angularly passive upwardly directed cup member with a soft upward peripheral seal. The center bearing member of the hold down support has a curved surface so that it supports at a point tangent to the underside surface of the work piece and the center bearing member. As a result, the only consideration in location of the hold downs, apart from concerns of adequacy of location of the supports and the material to be worked, is to insure that the outer periphery of the upper sealing cup has a sufficient area of smooth material opposing the sealing periphery of the upwardly directed sealing cup.

Because the upwardly directed sealing cup has a passive angular capability, sealing cups can be passively angularly displaced as the work piece is brought down onto the hold down supports. Activation of a vacuum between the upwardly directed sealing cup and the work piece acts to pull the work piece directly vertically down upon the main center bearing member, regardless of the angular position of the upwardly directed sealing cup thus stabilizing and forcefully securing the work piece. Depending upon the choice of material, the angular tilt of the upwardly directed sealing cup may be as much as fifty degrees or more of tilt in any direction, side, forward or back or any direction in between.

The vacuum service to the hold down support is of two types. Vacuum applied to one port holds the hold down support to the working table. Vacuum applied to the other port creates a vacuum between the work piece and the upwardly directed sealing cup. This enables a constant vacuum to lock the hold down supports into place, while permitting intermittent vacuum to be applied to each work piece before working and released after the working is concluded.

BRIEF DESCRIPTION OF THE DRAWINGS

The invention, its configuration, construction, and operation will be best further described in the following detailed description, taken in conjunction with the accompanying drawings in which:

FIG. 4 is a plan view of the hold down support illustrating a lowered position where the threaded main support member has been threadably turned to extend into the upper main vertical housing to lower the height of the upper cup support to a low profile;

FIG. 5 is a plan view of the hold down support from the same view as seen for FIG. 4, but with the threaded main support member backed out of the upper main vertical housing to raise the height of the upper cup support to a high support profile;

FIG. 16 illustrates a perspective view looking down on a working table having a series of six hold down supports supporting an area of curved glass and illustrating the a capability of the hold down supports to support a fairly simple complex shape.

DETAILED DESCRIPTION OF THE PREFERRED EMBODIMENT

Figure 1:
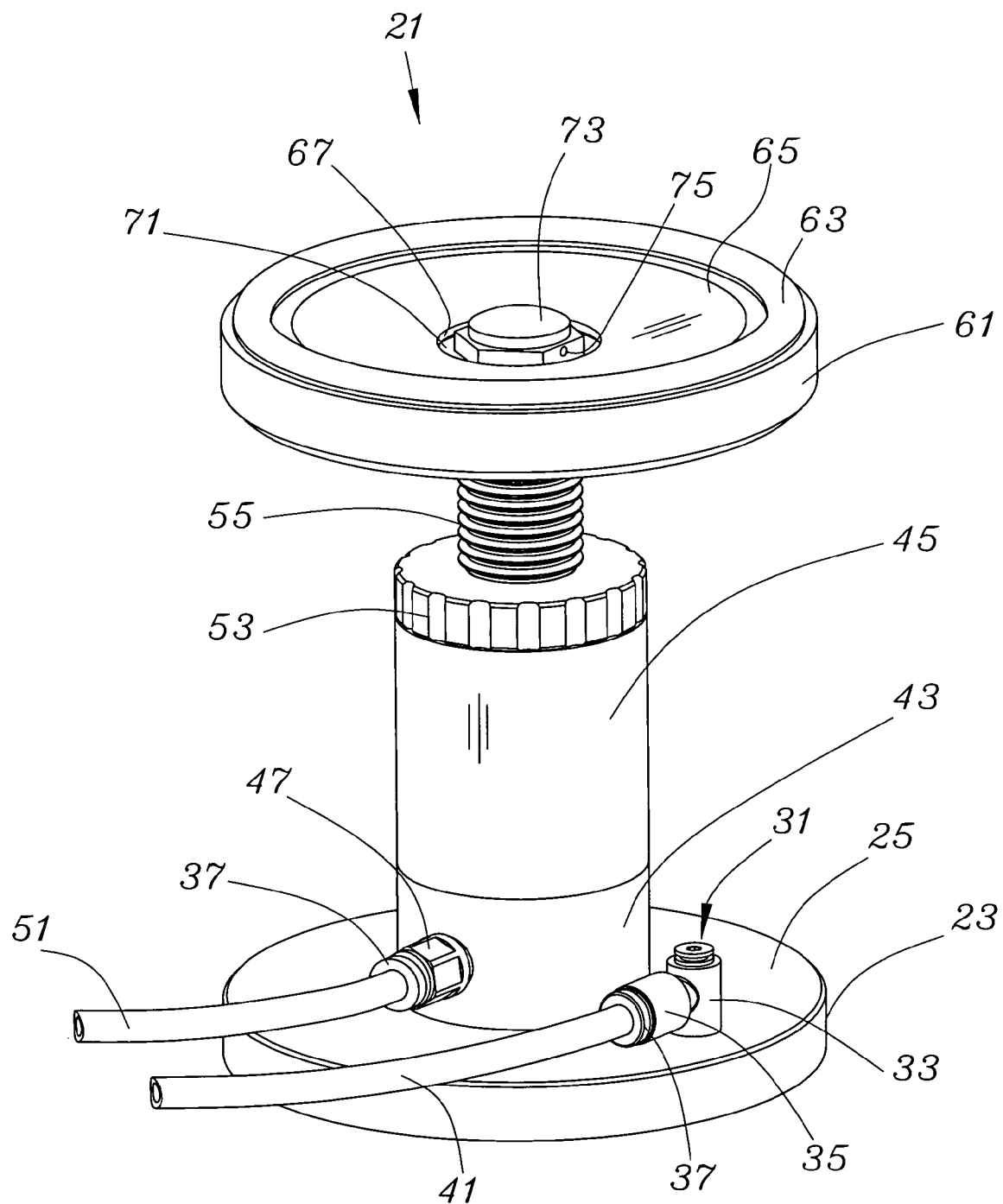
FIG. 1 is a perspective view of the machining device with vacuum hookups and illustrating the external features thereof.

A description of the height adjustable jack screw support with angularly flexible hold down is seen in FIG. 1 as a hold down support 21. Hold down support 21 has a base 23 having an upper surface 25 supporting a base vacuum fitting 31. Base vacuum fitting 31 may be a pivoting base vacuum fitting 31 having a rotational housing 33 and a hose fitting assembly 35. The hose fitting assembly 35 may include a push ring 37 which is springingly held in the hose fitting assembly 35 to accept an insertable vacuum hose 41. This type of fitting assembly admits the end of the vacuum hose upon insertion through the push ring 37 and locks it in against a removal force. Pushing the push ring 37 toward the hose fitting assembly 35 unlocks the vacuum hose 41 and permits its removal. As will be shown, vacuum transmitted through the vacuum hose 41 is transmitted below the base 23 and locks the base 23, and indeed the entire hold down support 21, to a working table (not shown).

Also seen in FIG. 1 supported by the upper surface 25 of the base vacuum fitting 31 is a lower main vertical housing 43 and an upper main vertical housing 45. As will be seen, the division of a main vertical housing 43 into two sections will facilitate the formation of vacuum conduit passages and structures in the lower main vertical housing 43.

The lower main vertical housing 43 supports an upper hold down vacuum fitting 45 having a push ring 37. A vacuum hose 51 is connected to the hold down vacuum fitting 45. As will be shown, a vacuum transmitted through the vacuum hose 51 will be transmitted though to the top of the hold down support 21 to secure a work piece. The vacuum hose 51 is expected to be selectively activated each time a new work piece is loaded onto the top of the hold down support 21, while vacuum hose 41 is used to stabilize the hold down support 21 device with respect to a table (not shown) and expected to remain activated so long as the hold down support 21 is finally located into its operating position on a work table (not shown). The vacuum hose 41 is typically indicated for securing the hold down support 21 to a table, while the vacuum hose 51 is intended for selective control and hold down of the object being supported by the hold down support 21.

Just above the upper main vertical housing 45, a ribbed, internally threaded locking nut 53 is seen. The internally threaded locking nut 53 threadably engages a threaded main support member 55. The threaded main support member 55 can be turned with respect to the upper main vertical housing 45 to cause it to be displaced upwardly or downwardly. It is the combination of the threaded main support member 55 and the internally threaded upper main vertical housing which is used to adjust the overall height of the hold down support 21. Once the threaded main support member 55 is turned to adjust height, the internally threaded locking nut 53 is turned onto the threaded main support member 55 to lock the threaded main support member 55 in place and to set the height of the hold down support 21.

FIG. 1 shows a portion of the upper structures. An upper cup support 61 may preferably be made of metal and may include an annular channel (not directly seen in FIG. 1) which supports a continuous ring of soft elastomeric 63. It is possible for upper cup support 61 to be a semi hard elastomeric material which incorporates a structure having the soft elastomeric 63 either integral to the upper cup support 61 or attached to it. The upper cup support 61 is seen to provide an extended area sealing structure which will maintain a vacuum in a way as to compress the continuous ring of soft elastomeric 63 to stabilize against deformation. The upper cup support 61 is constructed of metal so that minimum or no deformation will occur. The upper cup support 61 focuses the pressure against the work piece on to the continuous ring of soft elastomeric 63. In the resting position, the continuous ring of soft elastomeric 63 may be 7-8 millimeters above the upper cup support 61.

The upper cup support 61 has a shallow conical surface 65 which terminates at an inner edge 67. The shallow conical surface 65 makes an angle with respect to normal of about eight degrees. Just below the inner edge 67, an area of flexible elastomeric material 71 extends between the upper cup support 61 and a central bearing and vacuum supply nut 73. Central bearing and vacuum supply nut 73 has a vacuum port 75 which may include a horizontal through bore or opening extending to the opposite side of the central bearing and vacuum supply nut 73. The area of flexible elastomeric material 71 is locked into a space underneath the central bearing and vacuum supply nut 73 and underneath the upper cup support 61 and may preferably have any number of specialized shapes, especially adjacent its outer and inner periphery to enable flexible elastomeric material 71 to be securely held in place, and to resist dislodgement even where the upper cup support 61 is angularly displaced with respect to the vacuum supply nut 73.

The exposed area of flexible elastomeric material 71 seen in FIG. 1 is what allows the upper cup support 61 to flex with respect to the central bearing and vacuum supply nut 73 to enable it to turn and form a sealing vacuum with a work piece which may present an angled surface with respect to the vertical axis of the hold down support 21. Because of the abbreviated radial length of the area of flexible elastomeric material 71, it will experience no significant movement, change or deflection upon an application of vacuum between the upper cup support 61 and a work piece.

The central bearing and vacuum supply nut 73 has the ability to provide full vertical support to a work piece through the connection of the central bearing and vacuum supply nut 73 to the threaded main support member 55, and lower and upper main vertical housing 43 and 45, and base 23. Further, the base 23 can be of any size which will enable the hold down support 21 to resist a lateral moment which may be exerted during processing of the work piece.

Figure 2:
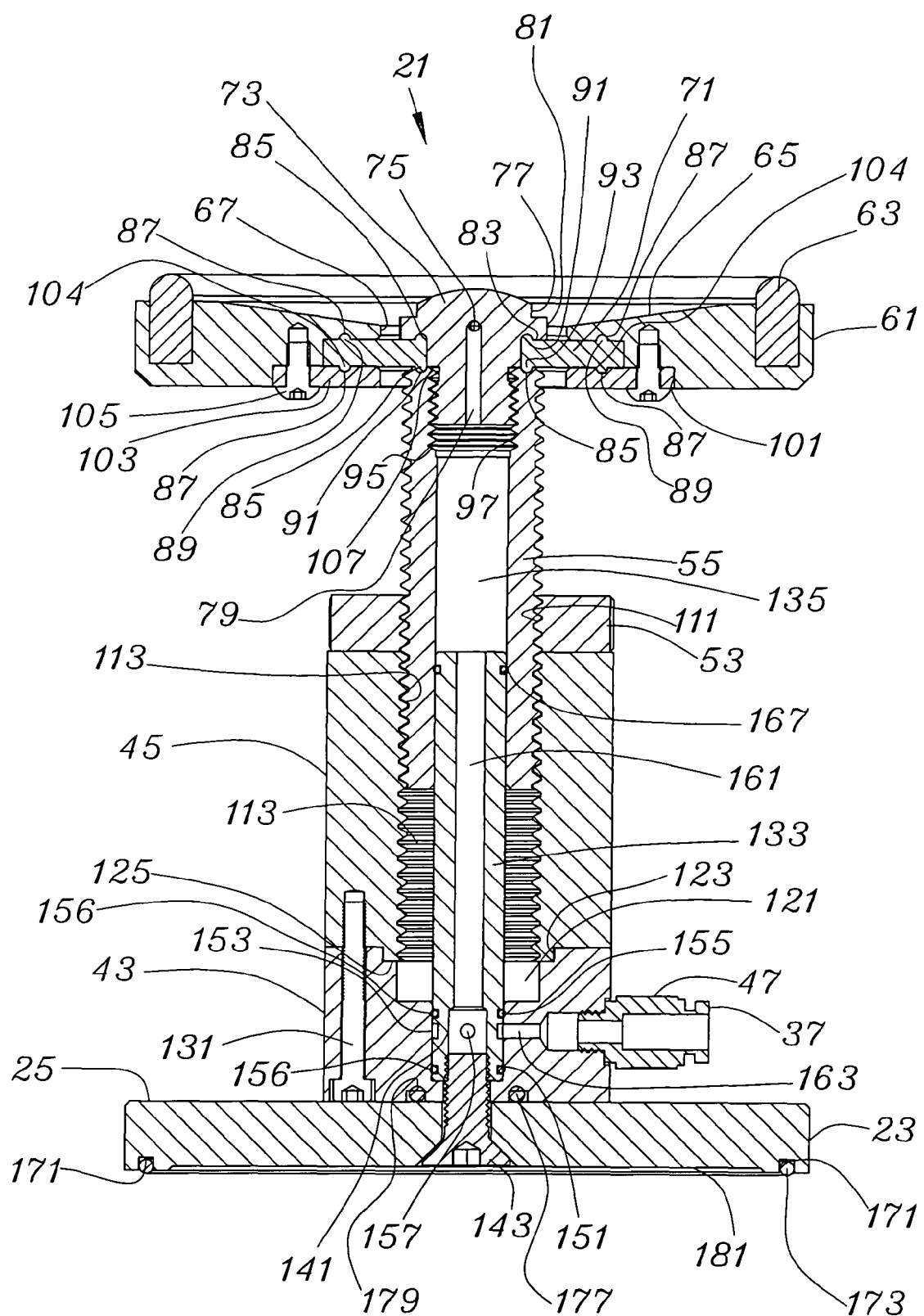
FIG. 2 is a cross sectional view of the machining device of FIG. 1 and illustrating the component parts of the machining device seen in FIG. 1.

Referring to FIG. 2, a side sectional view taken along line 2-2 of FIG. 1 illustrates further details thereof. Beginning at the central bearing and vacuum supply nut 73, a number of features are seen including an upper dome shaped surface having its highest point at the center of the central bearing and vacuum supply nut 73. This enables a bearing contact to be had with a lower surface of a work piece which is angled. Even for work pieces with angled lower surfaces, the point of bearing will still be within the domed area of the central bearing and vacuum supply nut 73. The upper dome shaped surface 75 transitions to a cylindrical surface 77 which is complementary to a curved locator block (not shown in FIG. 2) which is used to locate the hold down support 21. Central nut bore 79 is seen which is in communication with the vacuum port 75 seen in FIG. 1. An curved angular locator block (not shown) can have a structure having a depth and height for compatibility with the cylindrical surface 77 and presents a laterally narrower locator structure which has a lesser probability of interfering with other surfaces at the top of the hold down support 21. The cylindrical surface 77 can be located with a complementary surface which may have a radial extent less than semi-circular and perhaps as little as one quarter of a circle and still locate properly.

Below the cylindrical surface 77 of the central bearing and vacuum supply nut 73 a series of flat surfaces 81 are arranged to enable turning of the central bearing and vacuum supply nut 73 as by a tool. In one preferred embodiment, a hexagonal pattern of the flat surfaces 81 to form a 1⅛ inch hex nut has been found to work well. The flat surfaces 81 are supported on a land 83 which overlies the area of flexible elastomeric material 71. As can be seen, the area of flexible elastomeric material 71 may have a radially inwardly located continuous capture bump 85, which may or may not be on both sides of the area of flexible elastomeric material 71, and a radially outwardly located continuous capture bump 87, which may or may not be on both sides of the area of flexible elastomeric material 71. The continuous protrusion or upper capture bump 87 is seen as fitting in a downwardly directed continuous groove 89 formed in the upper cup support 61.

The use of capture bumps 83 and 85 provide another measure of holding force, outside of simple compression and the resistance to dislodgement based upon the extent to which the flexible elastomeric material 71 extends into a holding structure.

Similarly seen, is the land 83 that includes a downwardly directed groove 91 for capturing an upwardly directed radially inwardly located continuous capture bump 85. The top of the threaded main support member 55 may have an upwardly directed groove 93 for capturing a downwardly directed radially inwardly located continuous capture bump 85. The central bearing and vacuum supply nut 73 has a lower threaded surface 95 which engages an inwardly threaded surface 97 of the threaded main support member 55. Inwardly threaded surface 97 is shown as extending below the extent of the central bearing and vacuum supply nut 73 when the area of flexible elastomeric material 71 is present. As will be shown, elimination of the area of flexible elastomeric material 71 and further threaded insertion of the central bearing and vacuum supply nut 73 into the threaded main support member 55 will enable the formation of a support, which will be described beginning at FIG. 12.

As can be seen in FIG. 2, the upper cup support 61 includes a downwardly disposed angled groove 101 which, along with an attached capture plate 103 (which may or may not have a groove or other accommodating groove or structure for better hold of the area of flexible elastomeric material 71). Capture plate 103 surrounds the radially outward extent of and beneath the area of flexible elastomeric material 71. As is shown, the horizontal extent of the downwardly disposed angled groove 101 includes a downwardly disposed groove for accommodating an upwardly directed radially outwardly located continuous capture bump 87. Similarly, the capture plate 103, includes an upwardly disposed groove 104 for accommodating a downwardly directed radially outwardly located continuous capture bump 87. The capture plate may have a similar groove and which may be better seen in FIG. 3.

The capture plate 103, is secured to the upper cup support 61 with a series of bolts 105. The central bearing and vacuum supply nut 73 may also have a stop land 107 to stabilize the central bearing and vacuum supply nut 73 with respect to the threaded main support member 55 and to avoid over compression of the area of flexible elastomeric material 71.

As can be seen, the internally threaded locking nut 53 has internal threads 111. The upper main vertical housing 45 has internal threads 113 which engage the external threads of the threaded main support member 55. It is this threaded interface upon which the well supported and adjustable height of the central bearing and vacuum supply nut depends to support the work piece (not shown). The internal threads 113 extend down completely through the upper main vertical housing 45. A portion of the lower vertical housing 43 includes a bore 121 which somewhat continues the space within a bore at the surface of the internal threads 113. An inwardly and upwardly directed groove 123 on the lower vertical housing 43 interfits with a matching extension 125 on the upper vertical housing 45 to form a stable interfit that will not shift. Further, a through bolt 131 is seen extending into the lower vertical housing 43 and through into and engaging the upper main vertical housing 45 to join them securely.

At the lower center of the hold down support 21 is a tubular shaped vacuum extension structure 133. The vacuum extension structure 133 is used to insure that a sealed vacuum supply is transmitted through a smooth walled bore 135 of the threaded main support member 55, regardless of the height position of the threaded main support member 55 with respect to the lower and upper main vertical housing 43 and 45.

The vacuum extension structure 133 fits within a smaller bore 141 of the lower and upper main vertical housing 43 and 45 and is secured with a threaded bolt 143. A series of three channels extend horizontally around and surround the hold down vacuum fitting 47, including a first lower "o" ring sealing channel 151, an adjacent middle vacuum transmission channel 153 and a including a second lower "o" ring sealing channel 155. The "o" ring sealing channels 151 and 155 have "o" rings 156. The vacuum transmission channel 153 may have one or several apertures 157 extending though to an inner bore 161. The vacuum transmission channel 153 is positioned to align with a vacuum bore 163 which is in fluid communication with the hold down vacuum fitting 47. In this configuration, regardless of the rotational position of the vacuum extension structure 133, a vacuum can be transmitted through the hold down vacuum fitting 47, through the vacuum bore 163, to the vacuum transmission channel 153, apertures 157, inner bore 161 and into the smooth walled bore 135 of the threaded main support member 55. The vacuum is further transmitted through the nut bore 79 and the vacuum port 75 seen in FIG. 1.

The upper end of the vacuum extension structure 133 has an upper "o" ring sealing channel 167 to seal the vacuum inside the smooth walled bore 135 regardless of the height of the threaded main support member 55. Further, the turning action of the threaded main support member 55, along with its axial displacement will keep the vacuum inside smooth walled bore 135. Any air leakage between the external threads of the threaded main support member 55 and the internal threads 113 of the upper main vertical housing 45 will be stopped at the upper "o" ring sealing channel 167. Likewise, any potential air leakage from the bore 121 and into the middle vacuum transmission channel 153 will be stopped by "o" rings 156 in the first and second lower "o" ring sealing channels 151 and 155.

At the bottom of the base 23, a downwardly oriented base "o" ring channel 171 is seen containing a base "o" ring seal 173. This structure provides a base seal. Between the base 23 and the lower main vertical housing 43, a lower main vertical housing sealing groove 177 is seen to contain a lower main vertical housing "o" ring seal 179. The middle of the base 23 has an indented surface 181 to cause the downward pressure on the base 23 to be more concentrated at the periphery of the base 23 and so that any debris on the working table (not shown) will not compromise the base seal.

Figure 3:
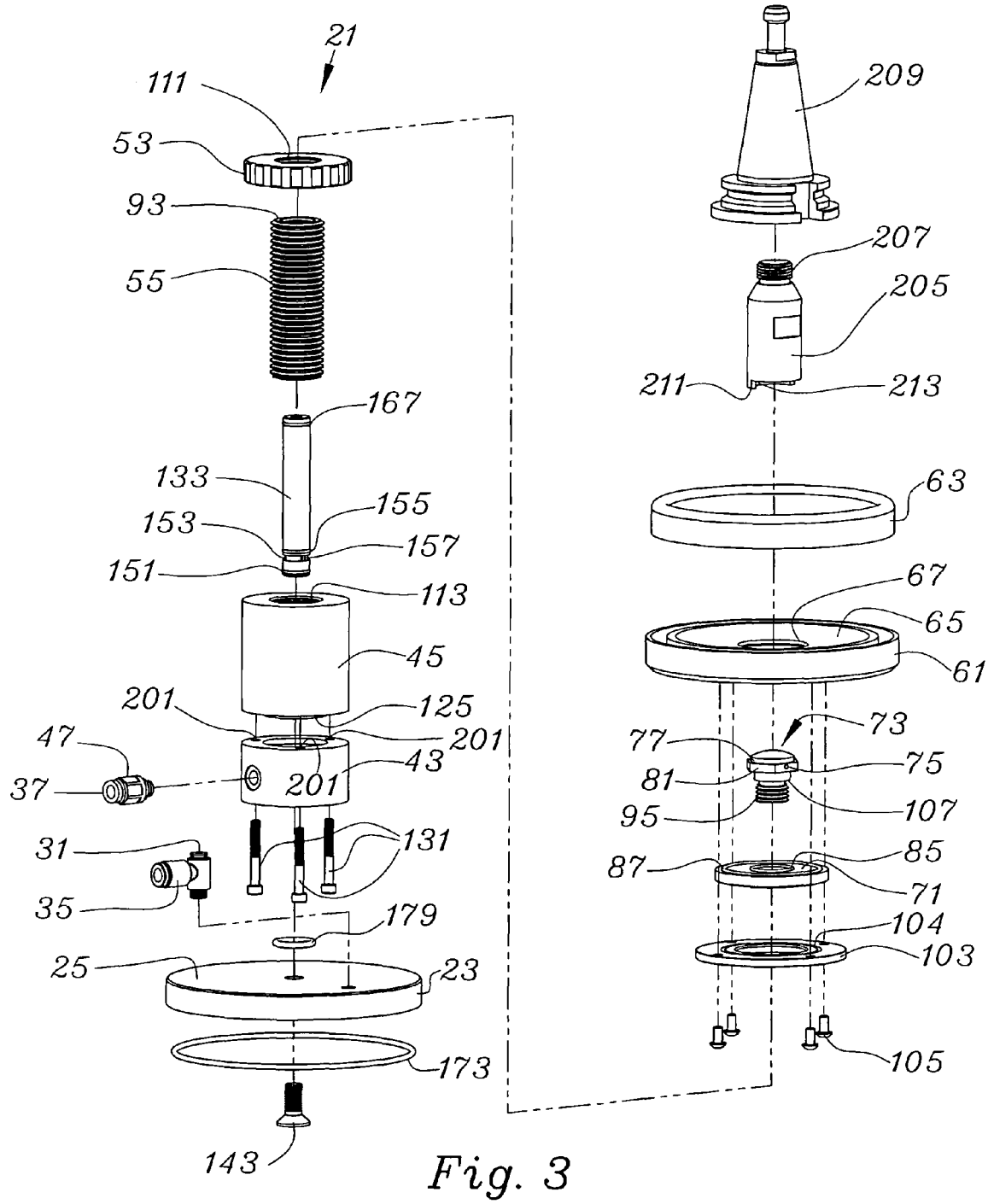
FIG. 3 is an exploded view of the hold down support showing the physical interrelationships in its construction, and also seen in conjunction with a positioning block.

Referring to FIG. 3, an exploded view of the hold down support 21 showing further details and the physical interrelationships of the component parts. Beginning at the bottom left side of the Figure, threaded bolt 143 is shown in an exploded relationship underneath the base "o" ring seal 173. Base 23 is next seen, and upper surface 25 is seen as being generally flat across the top of base 23. Just above the base surface 25 a lower main vertical housing "o" ring seal 179 is seen. The pivoting base vacuum fitting 31 and rotational housing 33 are seen the upper left of base 23.

Next, the through bolts 131 are seen to be three in number and are positioned for insertion into the lower main vertical housing 43. The hold down vacuum fitting 47 is seen threadably disconnected from the lower main vertical housing 43. A set of three through bores 201 are seen in the top of the lower main vertical housing 43 to permit the through bolts 131 to reach beyond the top of the lower main vertical housing 43 and into the upper main vertical housing 45.

Just above the upper main vertical housing 45, the vacuum extension structure 133 is seen, as well as the external details including first lower "o" ring sealing channel 151, middle vacuum transmission channel 153, second lower "o" ring sealing channel 155, and upper "o" ring sealing channel 167. Above the vacuum extension structure 133, threaded main support member 55 with external threads running its complete length. A portion of the upwardly directed groove 93 is also seen. Above threaded main support member 55, the internally threaded locking nut 53 is seen as well as a portion of its internal threads 111.

Following the center line over to the right of the drawing, the upper components of the hold down support 21 are seen. Continuing from the bottom the series of four bolts 105 which engage and attach the capture plate 103 to the underside of the upper cup support 61 are seen. The upwardly directed groove 104 is also seen on the capture plate 103 for achieving a better hold on the area of flexible elastomeric material 71 by more fully engaging the radially outwardly located continuous capture bump 87. Above the capture plate 103, is seen the ring shaped area of flexible elastomeric material 71 as well as the upwardly disposed radially inwardly located continuous capture bump 85 and radially outwardly located continuous capture bump 87. The ring shaped area of flexible elastomeric material 71 can have an underside which matches its upper side or it can be flat.

Above the ring shaped area of flexible elastomeric material 71 is seen the central bearing and vacuum supply nut 73, and its vacuum port 75, cylindrical surface 77 and flat surfaces 81 typically to assist in attaching it to the inwardly threaded surface 97 (not shown in FIG. 3) of the threaded main support member 55. Above the central bearing and vacuum supply nut 73, the upper cup support 61 is seen and the continuous ring of soft elastomeric material 63 is see above the upper cup support 61.

Above the upper cup support 61, is seen a structure which is not part of the hold down support 21 is seen as a curved locator block 205 having an upper thread set 207 for attachment into a conventional conic tool holder 209 which is normally rotationally supported by a motor unit (not shown). The curved locator block 205 differs from a traditional angled locator block in that a downwardly directed curved rim 211 has a radially inwardly directed surface 213 of complementary radius to the cylindrical surface 77 of the central bearing and vacuum supply nut 73. An angled block would still have the ability to locate the center of the central bearing and vacuum supply nut 73, but the interference from the upwardly sloping shallow conical surface 65 of the upper cup support 61 might interfere with the proper location of the hold down support 21. By having a downwardly directed curved rim 211, it will lie close to the central bearing and vacuum supply nut 73 and easily clear any possibility of interference with shallow conical surface 65.

Referring to FIG. 4, a plan view of the hold down support 21 illustrates the hold down support 21 in a position where the threaded main support member 55 has been threadably turned to extend into the upper main vertical housing 45 to lower the height of the upper cup support 61 to a generally nearly lowest profile. The ribbed, internally threaded locking nut 53 is shown in a lower position but can be loose and unlocked in this position.

Referring to FIG. 5, a plan view of the hold down support 21 from the same view as seen for FIG. 4 illustrates the hold down support 21 in a position where the threaded main support member 55 has been threadably turned to back out of the upper main vertical housing 45 to raise the height of the upper cup support 61 to a generally high and stable raised profile. The ribbed, internally threaded locking nut 53 is shown in a lower locked position as it would be if the hold down support 21 were ready for use.

Figure 6:
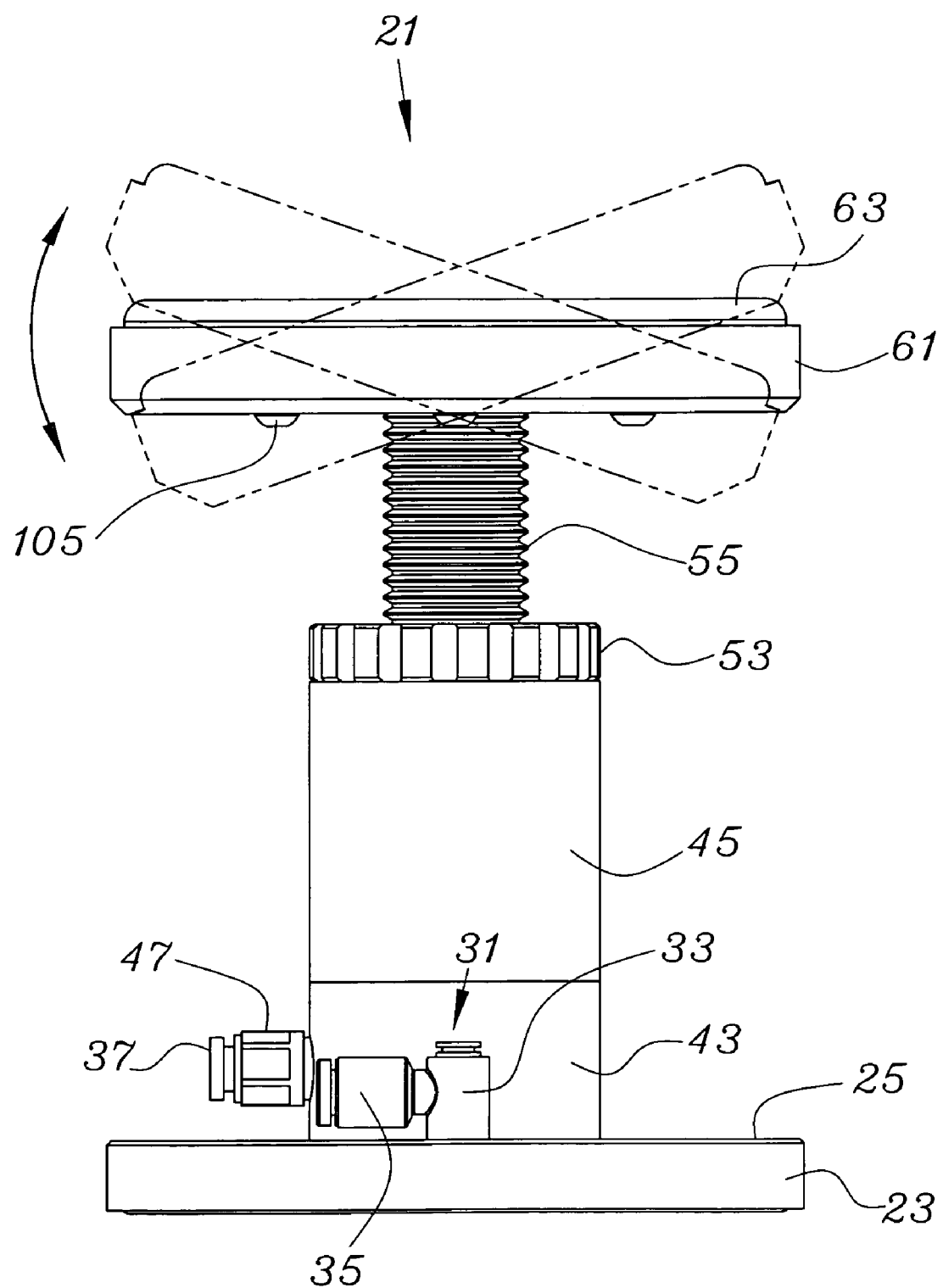
FIG. 6 is a plan view of the hold down support from the same view as seen for FIG. 5, but with upper cup support shown in solid resting position and in dashed line format in two positions of extreme-most tilt to illustrate the range of angular tilt for a lower surface which the hold down support can accommodate while still stably engaging an object to be worked.

Referring to FIG. 6, a plan view of the hold down support 21 from the same view as seen for FIG. 5 is shown, but with upper cup support 61 shown in solid resting position and in dashed line format in two positions of extreme-most tilt to illustrate the range of angular tilt. Since the tilt can occur in any direction with respect to the hold down support 21, it represents a wide range of angles of inclination and in any directions, which a lower surface of an object can have when placed in a position to be supported by such hold down support 21. The only general requirement is that the object to be worked have a generally continuous surface. The working out of the positioning of the hold down supports 21 can be pre-planned to insure that none of the hold down supports 21 are located in areas where the upper cup support 61 would encounter an obstruction or a generally non-continuous surface which would either interfere with or prevent suctioning hold down of the upper cup support 61.

Figure 7:
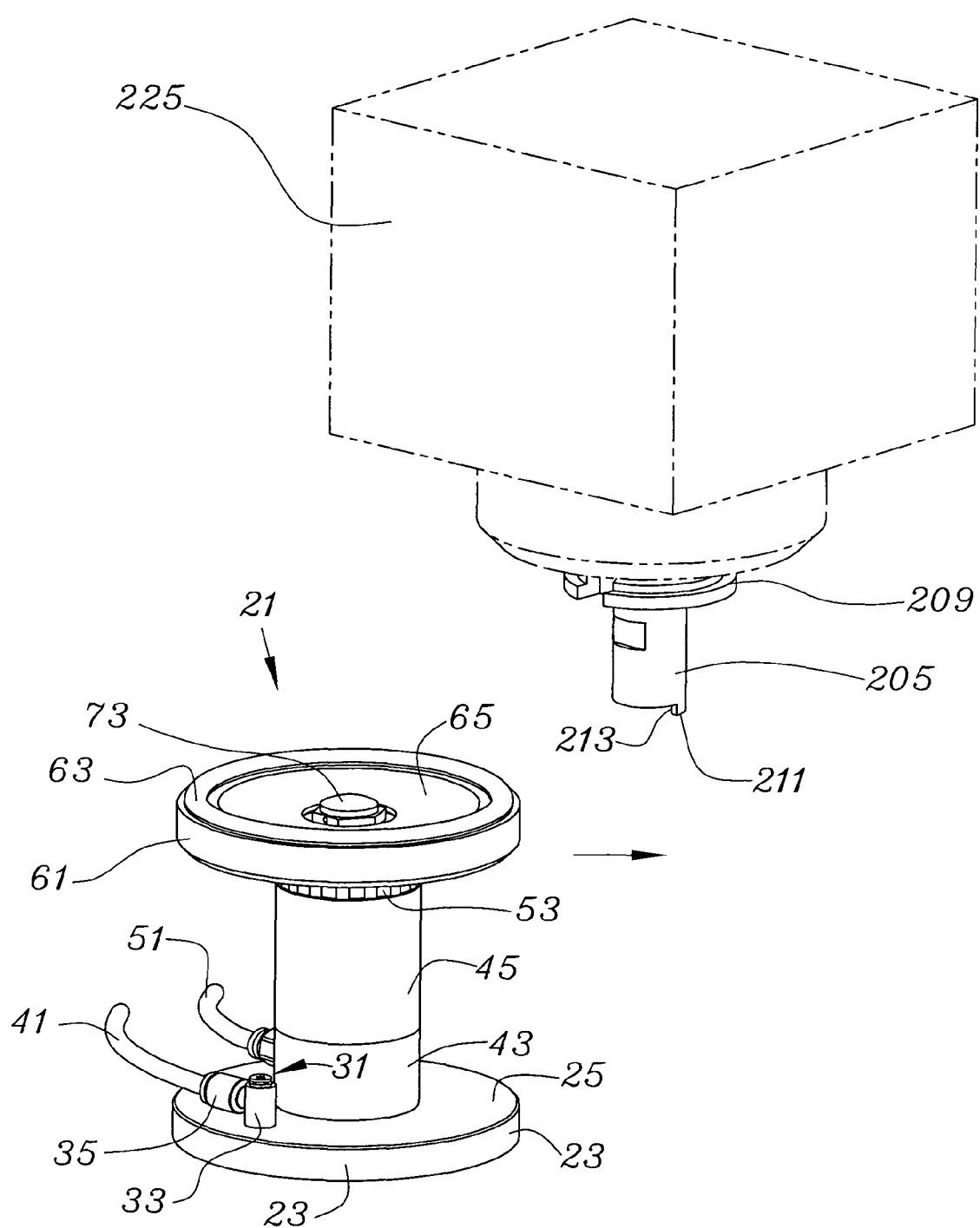
FIG. 7 is a first perspective view of a sequence illustrating one possible method of manual setup of the hold down support and illustrates the hold down support upper cup support in a down position and illustrating the hold down support being moved to a position as directly under a curved locator block as possible.
Figure 8:
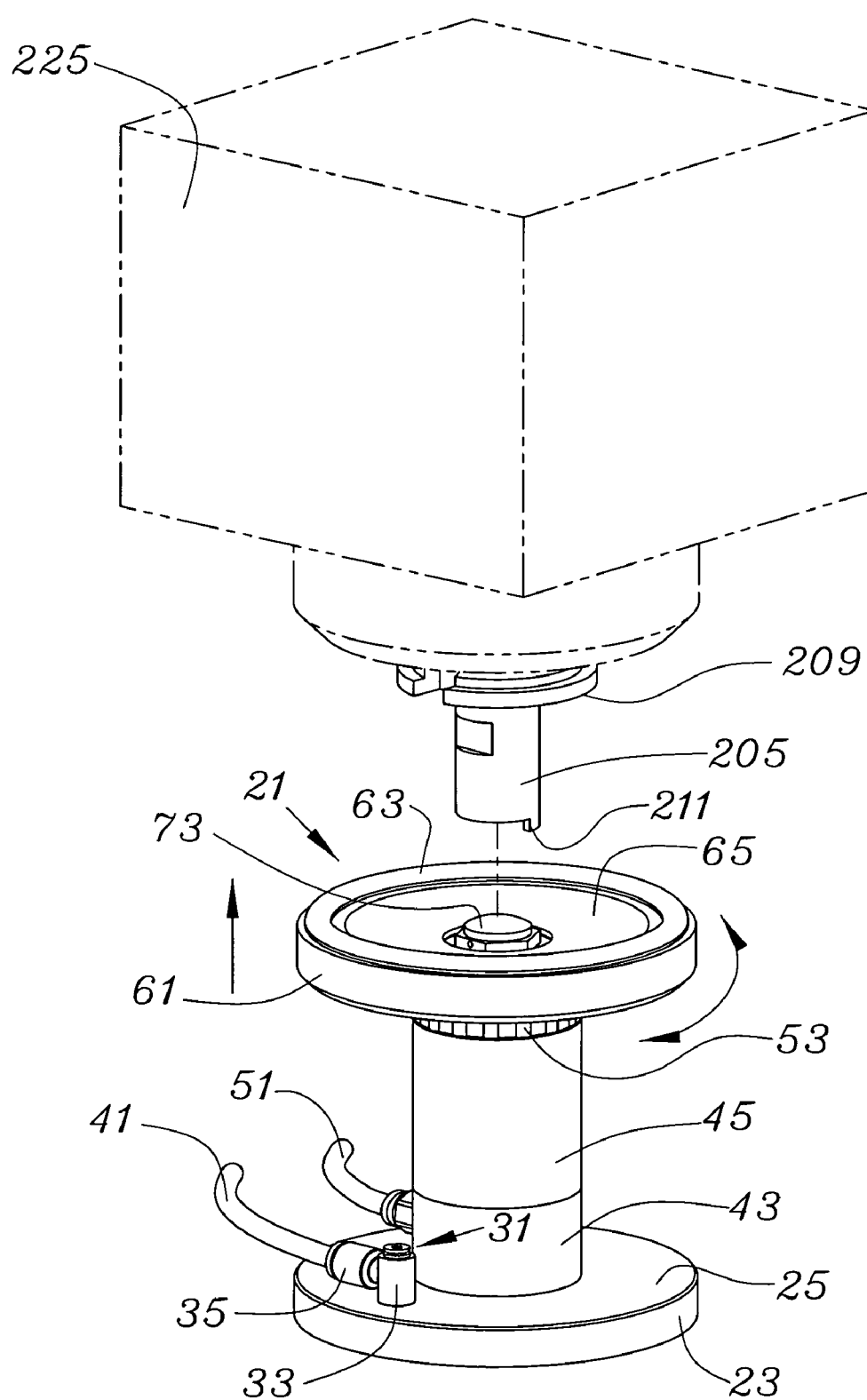
FIG. 8 is a second perspective view of a sequence illustrating the raising of the upper cup support by turning the threaded main support member and upper cup support once the hold down support is positioned directly under curved locator block to bring the central bearing and vacuum supply nut into close vertical proximity to the curved locator block.
Figure 9:
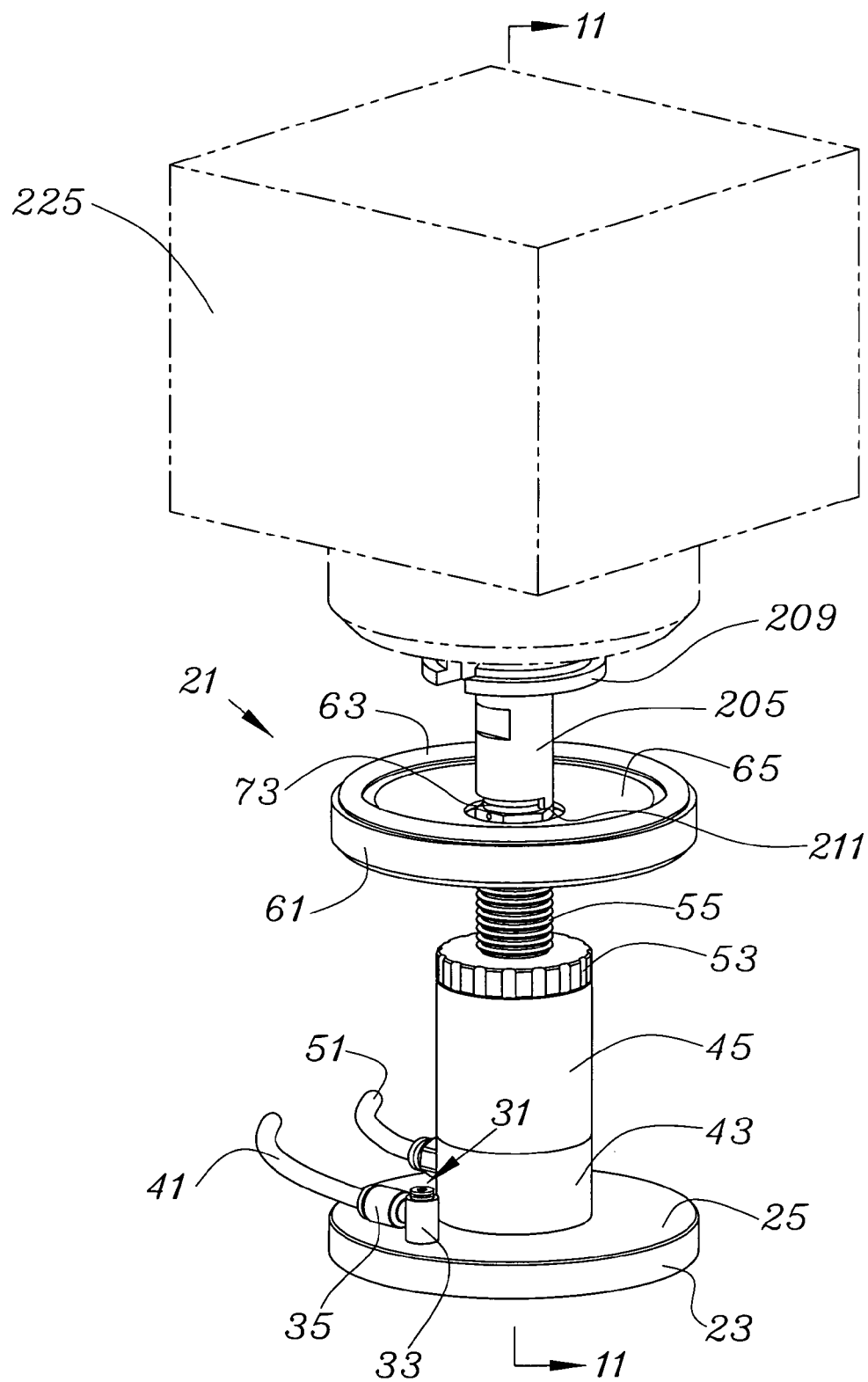
FIG. 9 is a second perspective view of a sequence illustrating the final slight raising and slight movement steps to first seat a cylindrical surface of a central bearing and vacuum supply nut into a radially inwardly directed surface of a downwardly directed curved rim of a curved locator block.

Referring to FIGS. 7-9, a sequence illustrating one possible method of manual setup of the hold down support 21 is shown. The reason that the hold down support 21 has such a wide range of use is that it is manually placeable and thus can be used with any existing working table. Even unsophisticated systems with weak computer simulation capability can utilize the hold down support 21. In the worst case, where some object has a way to have its location marked physically and the location of the hold down support 21 marked physically and its height measured physically, it is possible to use hold down support 21 in an advantageous manner. However, the more automated manner will be illustrated.

Referring to FIG. 7, a motor unit 225 is represented by a dashed line box shape. The motor unit 225 is typically automated over a table (not explicitly shown) upon which the hold down support 21 would otherwise seen to be resting. The motor unit 225 supports the conventional conic tool holder 209 which in turn supports the curved locator block 205. An automated controller (not shown) has the ability to specify the lateral location of the motor unit 225 (the x and y locations over a table), as well as the height of the motor unit 225 (the z location over a table). The use of a motor unit 225 to place the curved locator block 205 at an exact location over a table, and with an exact height enables the locating process to occur much more smoothly and sequentially, and without having to physically take measurements on a working table and its environs (not shown).

The controller also takes to account in its computations the length of the curved locator block 205, so that it can place the curved locator block 205 in a position which will present a center point height exactly equal to the center point height which the hold down support 21 should assume when positioned and when the upper curved portion of the central bearing and vacuum supply nut 73 is raised to the proper height. As will be seen, the bottom center of the curved locator block 205 will be used as a physical height limit against which the central bearing and vacuum supply nut 73 and upper cup support 61 will be raised.

FIG. 7 shows the motor unit 225 which can assume any position and height as directed from a controller. Typically, this setup will be sequential with a controller indicating the first positional location for the hold down support 21 and move to that height and location. Of course, the motor unit 225 is not rotationally operating, and curved locator block 205 is not spinning, and can generally assume any rotational position during the following location process.

At the start, the upper cup support 61 should be in the lower position as seen in FIG. 4. The motor unit 225 will be in a position similar to that seen in FIG. 7 with sufficient clearance between the upper cup support 61 and its continuous ring of soft elastomeric 63 and the downwardly directed curved rim 211 of the curved locator block 205.

Referring to FIG. 8, the person doing the positioning brings the hold down support 21 to a position generally centered underneath the curved locator block 205, and in a manner such that the continuous ring of soft elastomeric 63 will not contact the downwardly directed curved rim 211. Once the downwardly directed curved rim 211 is within the continuous ring of soft elastomeric 63, the upper cup support 61 can begin to be turned with respect to the upper main vertical housing 45 to cause the upper cup support 61 to rise with respect to the overall hold down support 21.

As the upper cup support 61 rises, the person performing the operation may make smaller adjustments to the position of the hold down support 21 as the central bearing and vacuum supply nut 73 rises toward the underside of the curved locator block 205. As the vacuum supply nut 73 is brought higher and higher toward the curved locator block 205, the person performing the operation makes even smaller adjustments as he or she continues to raise the vacuum supply nut 73 (and upper cup support 61) to a height where the radially inwardly directed surface 213 of the downwardly directed curved rim 211 is in a position to oppose the cylindrical surface 77 of the central bearing and vacuum supply nut 73.

Referring to FIG. 9, an expanded view of this position is seen, with further details of the close fit between the downwardly directed curved rim 211 and the cylindrical surface 77. The position seen in FIG. 9 is the position where the central bearing and vacuum supply nut 73 has been raised sufficiently that the cylindrical surface 77 can engaged and fit laterally into the radially inwardly directed surface 213 (not directly seen in FIG. 9) of the downwardly directed curved rim 211. At this point in the procedure, the top of the central bearing and vacuum supply nut 73 may be only a fraction of a millimeter away from or may be in direct bearing contact with a flat downwardly directed surface (not shown in FIG. 9) within of the curved locator block 205 adjacent the radially inwardly directed surface 213 of the downwardly directed curved rim 211.

Figure 10:
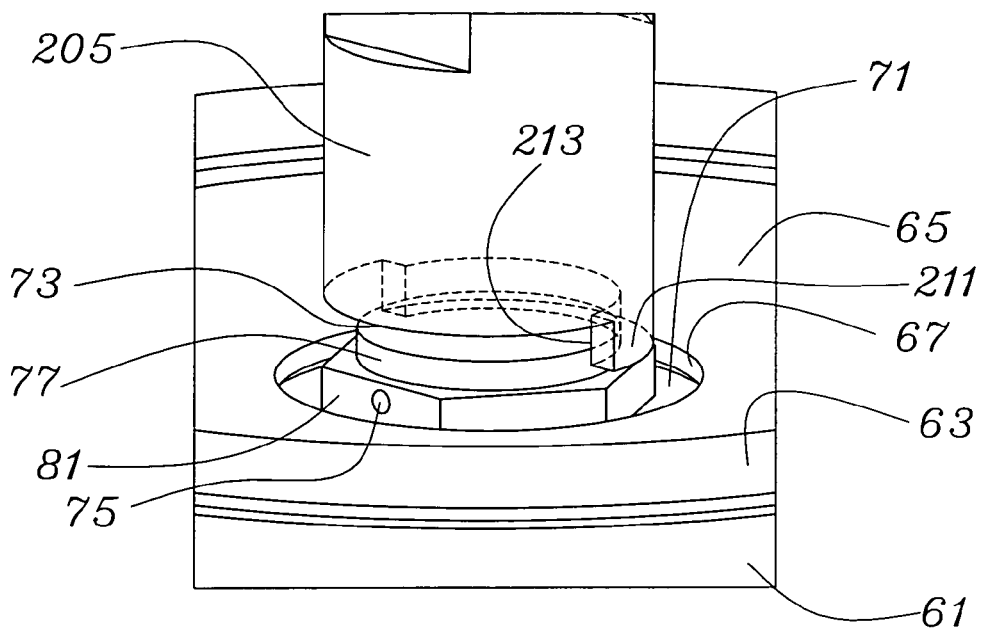
FIG. 10 is an expanded and partially through view illustrating the central bearing and vacuum supply nut and curved locator block illustrating the interaction of horizontal centering interactive surfaces.

Referring to FIG. 10, a partially through view of the surfaces just mentioned is shown and although the interaction between the top of the central bearing and vacuum supply nut 73 and the flat downwardly directed surface (not shown in FIG. 10) is also not seen, the drawing shows that only partial vertical overlap enables the lateral guided interaction between the radially inwardly directed surface 213 of the downwardly directed curved rim 211, and the cylindrical surface 77. Any significant overlap at all will enable the user to manually push the hold down support 21, sliding along a flat surface, toward the radially inwardly directed surface 213 to cause the matching cylindrical surface 77 to locate exactly the hold down support 21 directly centered underneath the curved locator block 205.

Since the manual placement worker can make such a centering movement, and laterally slide the hold down support 21, it is assumed that there is still a slight clearance and no solid bearing touching which would impede the final laterally locating movement. However, once such lateral centering location is accomplished, the manual worker then carefully turns the upper cup support 61 until the top of the central bearing and vacuum supply nut 73 and the flat downwardly directed surface (not shown in FIG. 10) make good bearing contact. At this point the hold down support 21 is completely located and correctly height adjusted.

Once this occurs, the ribbed, internally threaded locking nut 53 is turned downwardly and against the top of the upper main vertical housing 45 to lock the upper cup support 61 against any further turning. However, as an option, an important and possibly helpful step just after lateral centering and before turning of the upper cup support 61 to cause bearing contact between the top of the central bearing and vacuum supply nut 73 and the flat downwardly directed surface (not shown in FIG. 10), might be to create a vacuum in the vacuum hose 41 to activate the base vacuum to insure that any further turning of the upper cup support 61 will inhibit the worker from inadvertently or accidentally moving the hold down support 21 out of center with respect to the curved locator block 205.

Figure 11:
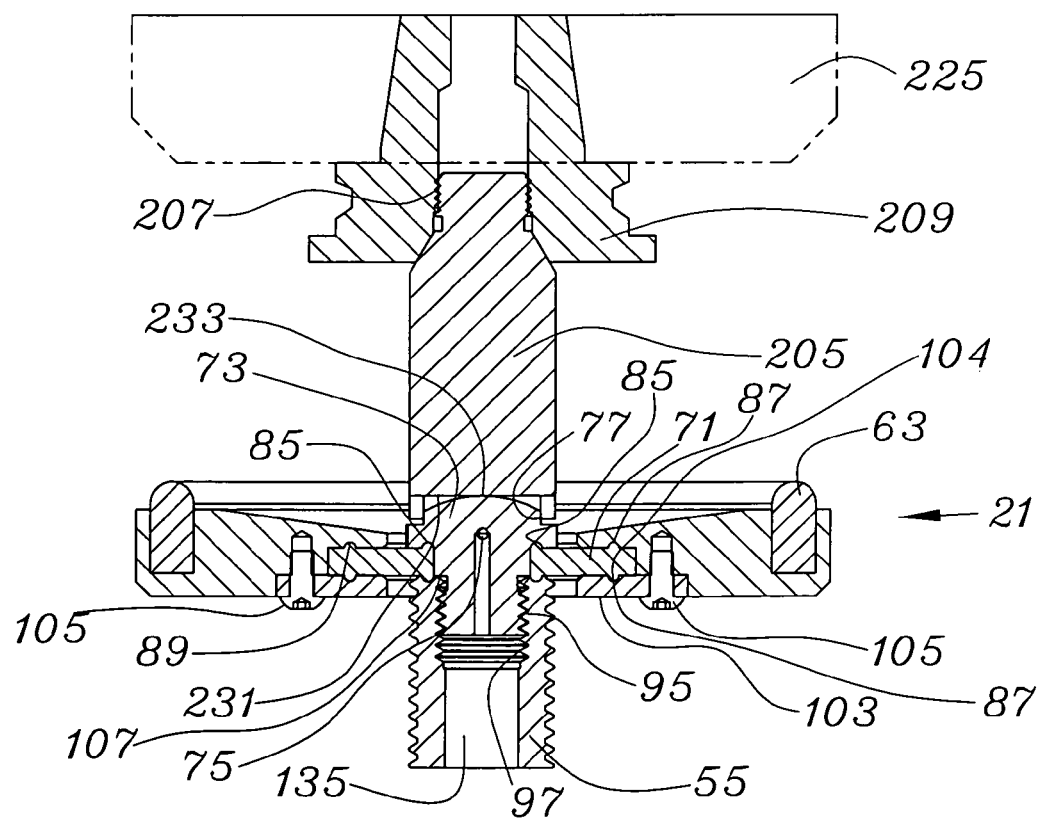
FIG. 11 illustrates a sectional view taken along line 11-11 of FIG. 9 and illustrates the bottom of the curved locator block and its downwardly directed flat surface which abuts a curved upper center of the central bearing and vacuum supply nut, as well as other details of the upper end of the hold down support 21.

Referring to FIG. 11, further details are shown with a sectional view taken along line 11-11 of FIG. 9. As can be seen, the bottom of the curved locator block 205 has a flat surface 231 which abuts a curved upper center 233 of the central bearing and vacuum supply nut 73. After the hold down support 21 is locked against flat surface 231, the manual worker will ideally trigger the controller program for the motor unit 225 to raise vertically from the hold down support 21 before moving laterally to the next location for the next hold down support 21. Initial lateral movement of the motor unit 225 may be impeded by the hold down support 21 or in a worse case damage the continuous ring of soft elastomeric 63. As a result, the motor unit 225 controller should be programmed to move vertically up, then laterally and then vertically down once a lateral position is achieved. This process is repeated until all of the requisite hold down supports 21 are placed and adjusted to their exact height.

Figure 12:
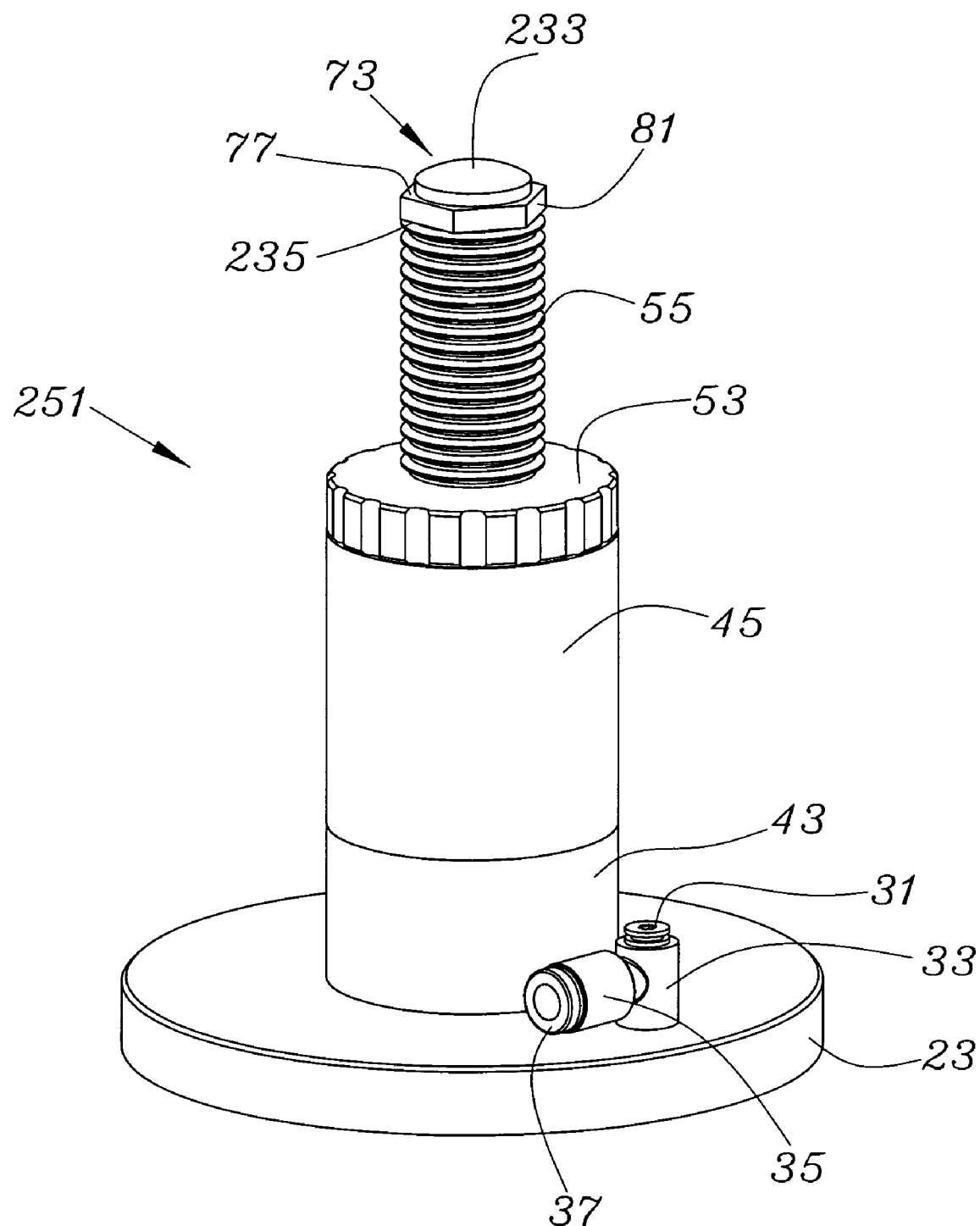
FIG. 12 illustrates a view of the hold down support without the upper cup support and area of flexible elastomeric material as an instructive and illustrative teaching the ability to remove the upper cup support and connecting area of flexible elastomeric material to form a bearing structure.

Referring to FIG. 12, a view of the hold down support 21 without the upper cup support 61 and area of flexible elastomeric material 71 is seen as a support 251. The support 251 is instructive and teaches the use of the same structure as seen in the earlier figures, but without the upper cup support 61 and connecting area of flexible elastomeric material 71. FIG. 12 is instructive in that it emphasizes the bearing and support nature of the hold down support 21 seen in FIGS. 1-11 as a bearing structure. The tilting action seen in FIG. 6 occurs with none of the objects seen in FIG. 13 having any motion. The tilting seen in FIG. 6 was an action between the outer periphery of the flexible elastomeric material 71 clamped by the upper cup support 61 and the inner periphery of the area of flexible elastomeric material 71 which is clamped by and between the central bearing and vacuum supply nut 73 and the threaded main support member 55. A small gap 235 is seen between central bearing and vacuum supply nut 73 and the threaded main support member 55 which is a junction which has been collapsed the inner periphery of the area of flexible elastomeric material 71 would otherwise be clamped, in order to best form the support 251.

As a support 251, the only change seen is that the central bearing and vacuum supply nut 73 has been either further threadably turned into the inwardly threaded surface 97 with the small gap 23 being minimized or turned to re-contact a stop surface, but the area of flexible elastomeric material 71 is nevertheless removed. This closure simply adds more stability to the support 251 and insures that the only height adjustment will be from threaded main support member 55. Note that base vacuum fitting 31, pivoting base vacuum fitting 31, rotational housing 33 and hose fitting assembly 35 remain in order to provide a vacuum hold down of the support 251. Further, the a curved upper center 233 can bear upon much smaller surfaces of any object to be worked, and used where only support is necessary in places where there is either no opportunity to engage the upper cup support 61 of hold down support 21 either through an interrupted surface, or a small bearing area or other prohibition.

Figure 13:
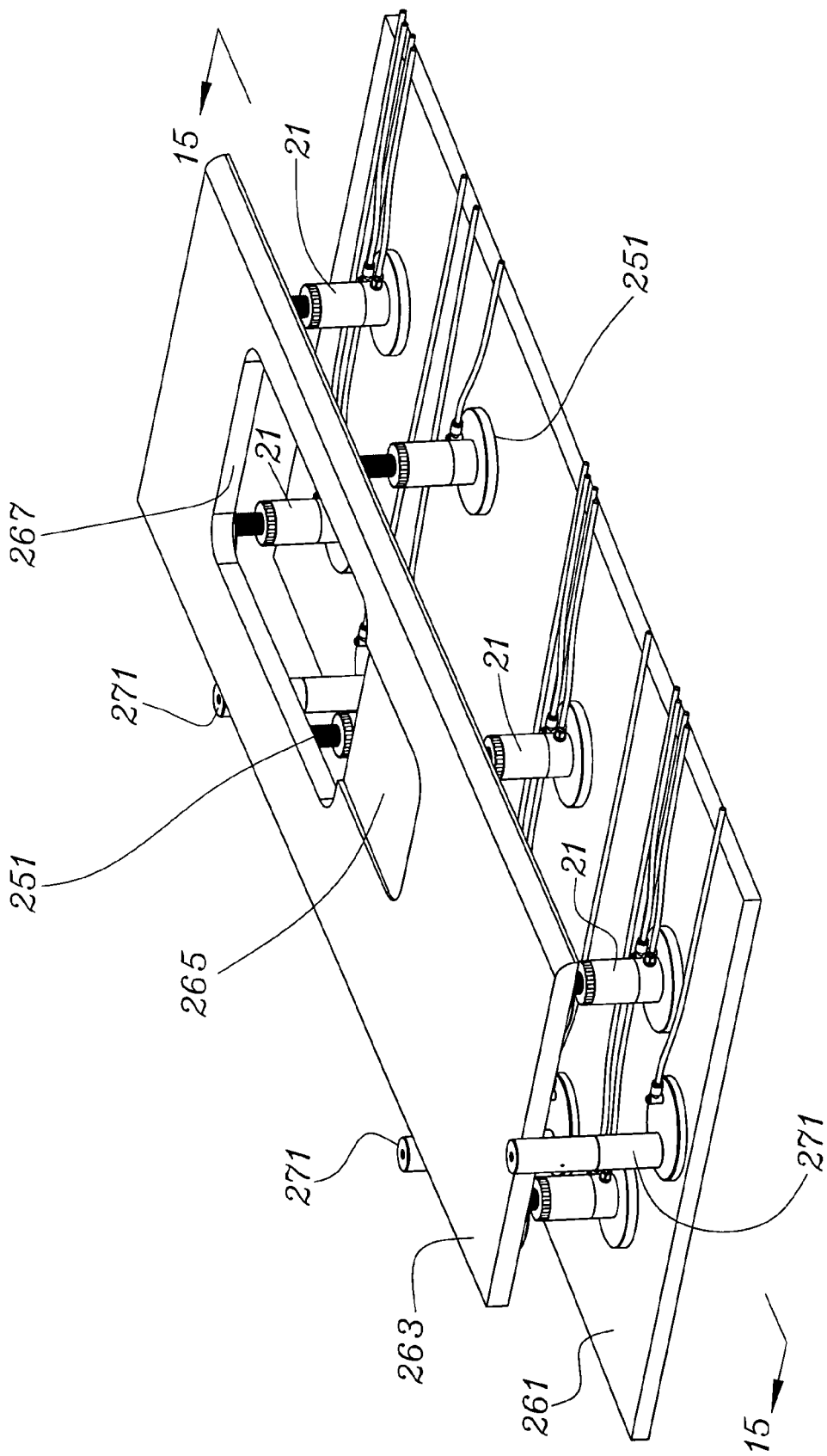
FIG. 13 illustrates a work table setup in which controlled tilt enables a slight machined angle to form an angled drainage surface adjacent a sink opening.

Referring to FIG. 13 a setup in which controlled tilt enables a machined angle, and which is more applicable to a three axis machine is shown. A table 261 contains a number of hold down supports 21 and supports 251 supporting a counter top 263 which has just been machine processed to form an angled drainage surface 265 adjacent a sink opening 267. Hold down supports 21 are each seen as having two vacuum supply hoses while the supports 251 have only a vacuum base hose. In addition, three end stop devices 271 are seen. The end stop devices 271 are devices which may preferably use vacuum for hold down and rise above the lower surface of the work piece such as counter top 263 so that when it is initially placed onto the table 261 it can be quickly, accurately and consistently placed in the same position with respect to the table 261 without having to take time to make small locational measurements. By providing a slight tilt to the counter top 263 equivalent to the angled desired for the angled drainage surface 265, a cutting head rotating about a vertical axis can produce the angled drainage surface 265.

Figure 14:
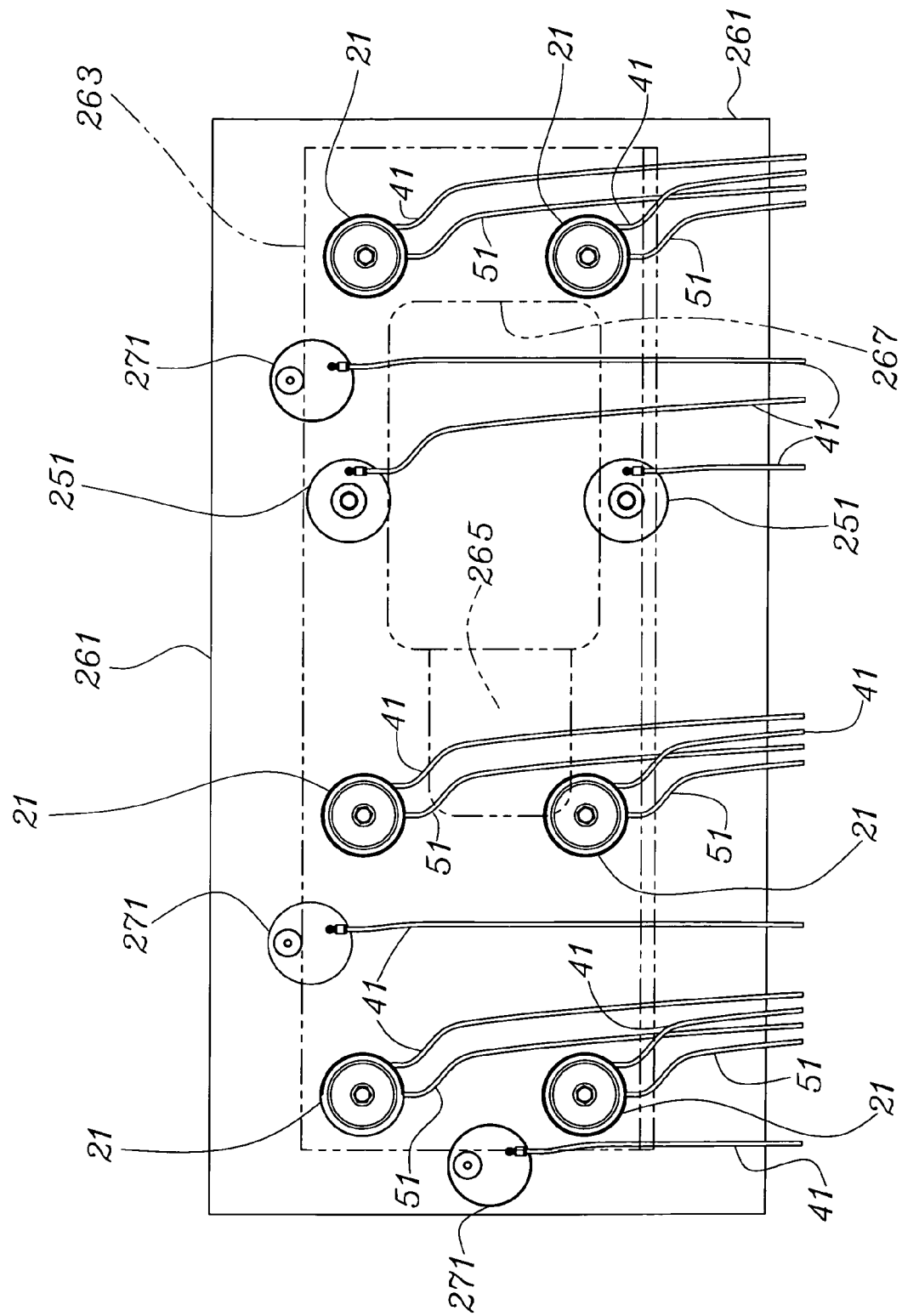
FIG. 14 is an underside view of the work table setup shown in FIG. 13 and illustrating the layout of hold down supports and supports, as well as stops.

Referring to FIG. 14, a view of the underside of the table 261 seen in FIG. 13 illustrates the placement of the hold down supports 21 in locations where there is sufficient flat area for vacuum hold down engagement. Each hold down supports 21 includes both a stabilization vacuum hose connection 41, and a controlled vacuum hold down vacuum hose connection 51. The other devices shown have only a stabilization vacuum hose connection 41.

Figure 15:
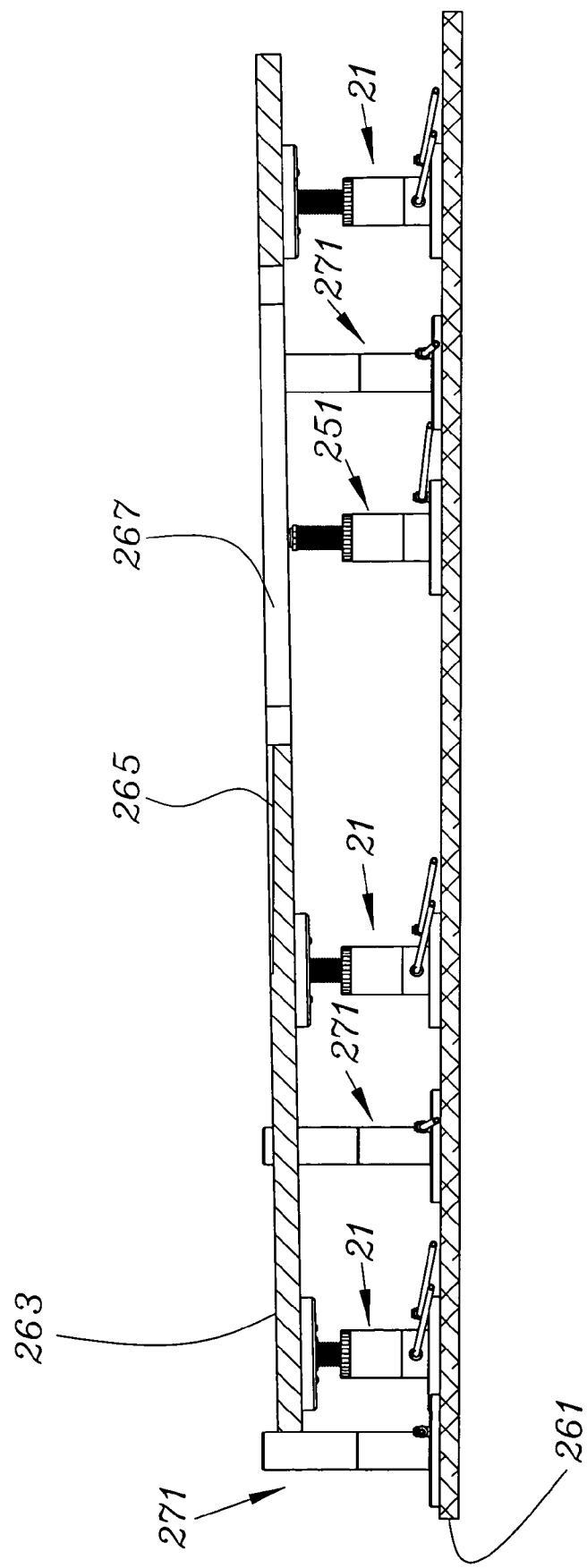
FIG. 15 is a plan view of the work table setup of FIGS. 13 and 14 which illustrates the slight angle of the counter top needed to produce the angled drainage surface.

Referring to FIG. 15, a plan sectional view taken along line 15-15 of FIG. 13 illustrates the very shallow angle of tilt needed to create the angled drainage surface 265. To successfully create such a surface, the counter top 263 must be well and adequately supported to withstand the lateral and downward forces resulting from the machining to create the angled drainage surface 265. Without adequate support and positive hold down, any bowing of the counter top 263 during processing would create a ruined surface and the entire counter top 263 would have to be scrapped.

Referring to FIG. 16, a perspective view looking down on the table 261 illustrates a series of six hold down supports 21 supporting an area of curved glass 291, and may be generally applicable to an edge grinding operation performed by a five axis machine. Although the curvature shown is in one direction, the hold down supports could support an area of glass having a more complex shape. As can be seen, the upper cup support 61 of each hold down support 21 assumes an angle so that it can have a flat suction seal with respect to the glass. It should be remembered that the upper cup support 61 creates a force in the direction of the work piece, but that the work piece, in this case an area of curved glass 291, is held against the bearing contact of the curved upper center 233 based upon the force limited by the web of area of flexible elastomeric material 71 especially between the radially inwardly located continuous capture bump 85 and radially outwardly located continuous capture bump 87, but especially that of area of flexible elastomeric material 71 seen between the central bearing and vacuum supply nut 73 and upper cup support 61 especially as was seen in FIG. 1. It is expected that the angular range of about thirty to about fifty from its normal horizontal position, and in any direction.

While the present invention has been described in terms of a device and system used in conjunction with all types of process machinery, and in particular with machinery for the milling, edging and machining of materials including glass, granite, marble, stone, and the like, one skilled in the art will realize that the structure and techniques of the present invention can be applied to many appliances. The present invention may be applied in any situation where the position of components are desired to be precisely located in three dimensional space without the use of custom dedicated fixturing.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A support for supporting and holding a work piece for processing comprising:
   a body having a base with a first vacuum port for securing the body to a table using the first vacuum port, the body having an internal threaded structure;
   a threaded main support member having an external thread engaged with the internal threaded structure of the body to adjust a height of the threaded main support member;
   a central bearing nut threadably inserted into a set of internal threads carried by the threaded main support member, the central bearing nut having an upper portion having an uninterrupted curved surface and having maximum height at an axial center of the central bearing nut and curving radially evenly away from the maximum height at the axial center for facilitating bearing against and supporting an object having surfaces having a non-normal angle with respect to the central bearing nut; and
   an internally threaded locking nut threadably engaged with the external thread of the threaded main support member to lock the threaded main support member from threaded rotation with respect to the body.

2. The support as recited in claim 1 and further comprising an internally threaded locking nut threadably engaged with the external thread of the threaded main support member to lock the threaded main support member from threaded rotation with respect to the body.

3. A support for supporting and holding a work piece for processing comprising:
   a body having a base with a first vacuum port for securing the body to a table using the first vacuum port, the body having an internal threaded structure;
   a threaded main support member having an external thread engaged with the internal threaded structure of the body to adjust a height of the threaded main support member;
   a central bearing nut threadably inserted into a set of internal threads carried by the threaded main support member, the central bearing nut having an upper portion for bearing against an object for being supported;
   an area of flexible elastomeric material supported between the threaded main support member and the central bearing nut;
   an upper cup support spaced apart from the central bearing nut and engaging the area of flexible elastomeric material at a position spaced apart from the engagement of the area of flexible elastomeric material between the threaded main support member and the central bearing nut such that the upper cup support is flexibly supported; and
   a second vacuum port supported by the body and in fluid communication adjacent the upper cup support for creating a vacuum between the upper cup support and an object to be supported.

4. The support as recited in claim 3 wherein the area of flexible elastomeric material supported between the threaded main support member and the central bearing nut includes a protruding structure to prevent disengagement of the flexible elastomeric material from between the threaded main support member and the central bearing nut.

5. The support as recited in claim 3 wherein the area of flexible elastomeric material supported by the upper cup support includes a protruding structure to resist disengagement of the flexible elastomeric material from dislodging from the upper cup support.

6. A support for supporting and holding a work piece for processing as recited in claim 3 and wherein the base has a main bore which includes the internal threaded structure of the body, and further comprising a vacuum extension structure having a central bore in fluid communication with the second vacuum port, a first end supported by the body and a second end in axially sealed sliding communication with the threaded main support member to provide a vacuum through the threaded main support member regardless of the height of the threaded mean support member with respect to the base.

7. A support for supporting and holding a work piece for processing as recited in claim 6 wherein the a central bearing nut has a central nut bore in fluid communication with the central bore of the vacuum extension structure, and wherein the central bearing nut has a vacuum port between the central nut bore and the outside of the central bearing nut adjacent the curved upper portion of the central bearing nut to transmit a source of vacuum between the upper cup support and an object to be supported.

8. A support for supporting and holding a work piece for processing as recited in claim 6 wherein the vacuum extension structure first end is secured to the body using the main bore, and wherein the vacuum extension structure includes a vacuum transmission channel surrounding an exterior surface of the vacuum extension structure and in communication with the central bore by at least one aperture extending between the vacuum transmission channel and the central bore of the vacuum extension structure, and where the vacuum transmission channel is in fluid communication with the second vacuum port.

9. The support as recited in claim 8 where the upper cup support includes an upwardly directed channel for supporting the ring of elastomeric material.

10. The support as recited in claim 3 and further comprising a ring of elastomeric material adjacent an outer periphery of upper cup support for engaging an objected to be supported and to facilitate the maintenance of a vacuum between the upper cup support and an object to be supported.

11. A process for setting up a support for supporting and holding a work piece for processing comprising the steps of:
providing an adjustable height support having a body including a base with a first vacuum port for securing the body to a table using the first vacuum port, a threaded main support member having an external thread engaged with the internal threaded structure of the body to adjust a height of the threaded main support member, and a central bearing member supported at the other end of the threaded main support member;
positioning a motor unit having a locator block, having a horizontal surface and a lateral surface, at an exact lateral position and height over a surface from which a work piece is to be indirectly supported with the locator block assuming a position over which a lower surface of the work piece is to be located during working;
bringing the adjustable height support to a position generally centered underneath the locator block;
turning the threaded main support member with respect to the base to cause the threaded main support member central bearing member to contact the locator block horizontal surface and lateral surface to enable the adjustable support to assume a position of support for supporting a work piece during working.

12. The process for setting up a support for supporting and holding a work piece as recited in claim 11 and further comprising the step of supplying a source of vacuum to the first vacuum port to secure the body to a table.

13. The process for setting up a support for supporting and holding a work piece as recited in claim 11 wherein the adjustable height support includes an upper cup support flexibly attached to the central bearing member and in communication with a second vacuum port, and comprising the steps of:
supporting a work piece atop the central bearing member; and
supplying a source of vacuum to the first vacuum port to secure the work piece to the adjustable height support.

* * * * *